(12) United States Patent
Kunz et al.

(10) Patent No.: US 8,443,485 B2
(45) Date of Patent: May 21, 2013

(54) OUTLET BOX FOR POWER TOOL SENSE

(75) Inventors: Michael P. Kunz, Hampstead, MD (US); Robert Bradus, Bel Air, MD (US); John Cunningham, Perry Hall, MD (US); Larry T. Albert, Abingdon, MD (US); David R. Beers, Dallastown, PA (US)

(73) Assignee: Black & Decker Inc., Newark, DE (US)

( * ) Notice: Subject to any disclaimer, the term of this patent is extended or adjusted under 35 U.S.C. 154(b) by 1074 days.

(21) Appl. No.: 12/352,042

(22) Filed: Jan. 12, 2009

(65) Prior Publication Data

US 2009/0183336 A1 Jul. 23, 2009

Related U.S. Application Data

(60) Provisional application No. 61/021,971, filed on Jan. 18, 2008.

(51) Int. Cl.
*A47L 9/00* (2006.01)

(52) U.S. Cl.
USPC .................................. 15/339; 15/314; 15/319

(58) Field of Classification Search
USPC ............................................ 15/314, 319, 339
See application file for complete search history.

(56) References Cited

U.S. PATENT DOCUMENTS

| | | | |
|---|---|---|---|
| 5,120,983 A | 6/1992 | Samann | |
| 5,541,457 A * | 7/1996 | Morrow | 307/38 |
| 6,044,519 A | 4/2000 | Hendrix | |
| 6,222,285 B1 * | 4/2001 | Haley et al. | 307/129 |
| 7,341,481 B2 * | 3/2008 | Spiri et al. | 439/535 |

* cited by examiner

*Primary Examiner* — Lee D Wilson
*Assistant Examiner* — Shantese McDonald
(74) *Attorney, Agent, or Firm* — Harness, Dickey & Pierce, P.L.C.

(57) ABSTRACT

A vacuum electronic power tool sense system senses the operation of a power tool that is plugged into an auxiliary outlet box and the vacuum source is automatically operated to facilitate user clean-up of debris generated by use of the power tool. The auxiliary outlet box can be removably mounted to the vacuum housing.

5 Claims, 8 Drawing Sheets

OUTLET BOX FOR POWER TOOL SENSE

CROSS-REFERENCE TO RELATED APPLICATION

This application claims the benefit of U.S. Provisional Application No. 61/021,971, filed on Jan. 18, 2008. The entire disclosure of the above application is incorporated herein by reference.

FIELD

The present disclosure relates to electronics for vacuum cleaners, and more particularly to an electronic power tool sense system for a vacuum.

BACKGROUND

The statements in this section merely provide background information related to the present disclosure and may not constitute prior art.

Conventional industrial shop vacuums are employed for both wet and dry usage. However, the electronics for conventional industrial shop vacuums can be primitive in design.

Conventional vacuums may include a container and a cover that closes the container. The cover may support a vacuum motor with a power cord. The power cord may include a power plug that may be connected to a power source. When powered up, the vacuum motor may rotate a suction fan, thereby drawing air from the container. A flexible hose may be mounted on an inlet to the vacuum for drawing debris (including solids, liquids, and gases) into the container.

Conventional vacuums may also include an onboard power outlet that may be electrically connected to the power cord of the vacuum. The onboard power outlet may receive a power plug of a power tool. Accordingly, a user may plug the power plug of the vacuum motor into a power outlet in a wall (or some other power source), and plug the power plug of the power tool into the onboard power outlet of the vacuum. In this way, the vacuum motor and the power tool may be driven with only a single power cord (i.e., the power cord of the vacuum) being physically connected to a power source.

While the conventional onboard power outlets are generally thought to provide acceptable performance, they are not without shortcomings.

SUMMARY

The present disclosure provides a vacuum electronic power tool sense system for sensing the operation of a power tool that is plugged into a power outlet. The power outlet can be provided in a separate outlet box from the vacuum housing. The outlet box is electrically connected to a vacuum source of the vacuum. A control module can operate the vacuum source in response to a sensed operation of the power tool plugged into the power outlet of the separate power outlet box to provide simultaneous operation of the power tool and vacuum in order to facilitate user clean-up of messes generated by use of the power tool.

A vacuum system according to the present disclosure includes a vacuum having a housing and a vacuum source disposed in the housing. There is an outlet box separate from the vacuum and electrically connected to the vacuum source. The system includes a power tool sensing system for sensing operation of a power tool plugged into the outlet box. The system also includes a control module for operating the vacuum source in response to a sensed operation of the power tool.

A vacuum according to the present disclosure includes a housing and a vacuum source disposed in the housing and including a motor. An outlet is electrically connected to the vacuum source. A power tool sensing system senses operation of a power tool plugged into the outlet. A control circuit operates the vacuum source in response to a sensed operation of the power tool. The control circuit includes a triac that provides electricity to the motor of the vacuum source and an opto-coupler that provides an activation voltage to the triac. The triac provides electricity to the motor when receiving the activation voltage from the opto-coupler.

A vacuum system according to the present disclosure includes a vacuum having a housing and a vacuum source including a motor. There is an outlet box separate from the vacuum and electrically connected to the vacuum source. The outlet box includes an outlet for supplying electrical power and a power tool sensing system for sensing operation of a power tool plugged into the outlet. The system also includes a control module for operating the vacuum source in response to a sensed operation of the power tool provided by the power tool sensing system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
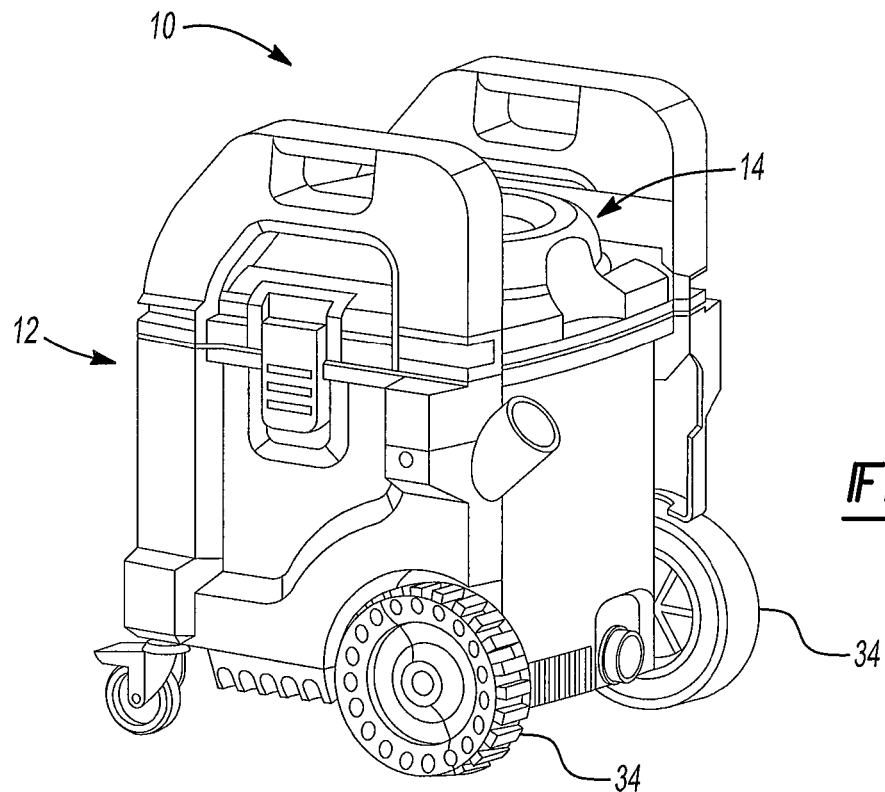
FIG. 1 is a perspective view of an example industrial shop vacuum according to the principles of the present disclosure.

The following description is merely exemplary in nature and is not intended to limit the present disclosure, application, or uses. It should be understood that throughout the drawings, corresponding reference numerals indicate like or corresponding parts and features. As used herein, the term "module" may refer to an application-specific integrated circuit (ASIC), an electronic circuit, a processor (shared, dedicated, or group) and memory that executes one or more software or firmware programs, a combinational logic circuit, or other suitable components that provide the described functionality.

Figure 2:
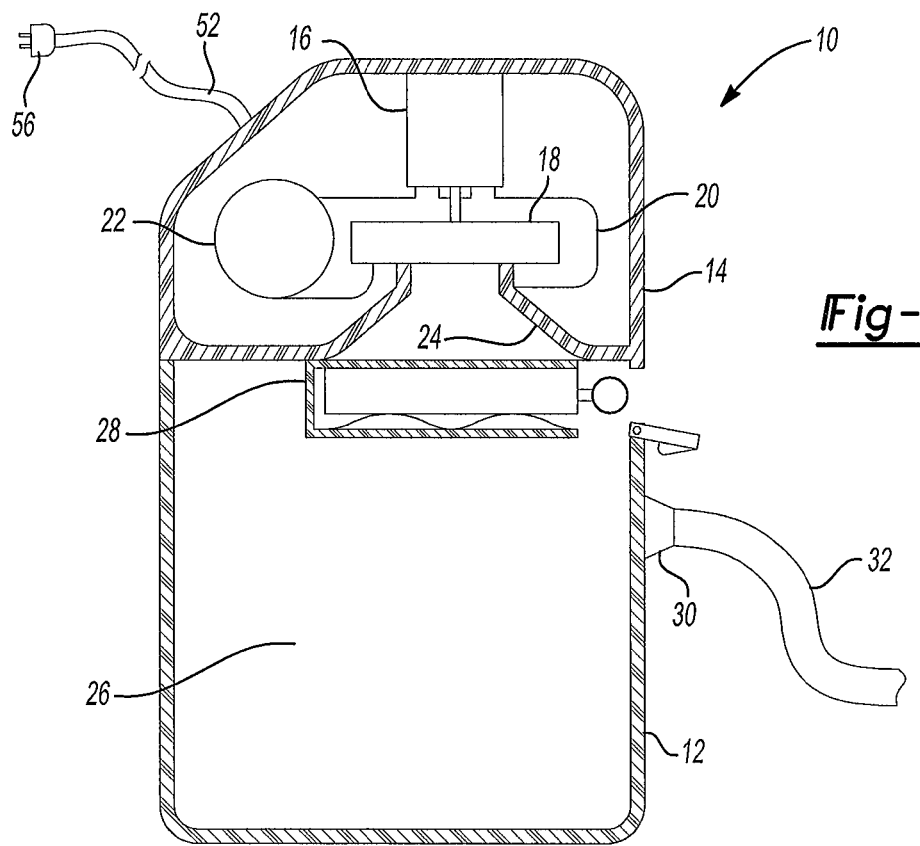
FIG. 2 is a schematic diagram of an example industrial shop vacuum according to the principles of the present disclosure.

With reference to FIGS. 1 and 2, an example vacuum 10, according to the principles of the present disclosure, will now be described. The vacuum 10 may include a canister 12 and a vacuum head 14 that closes the canister 12. The vacuum head 14 may support a drive motor 16. The drive motor 16 may support a suction fan 18, which may be provided in a fan chamber 20 of the vacuum head 14. The fan chamber 20 may be in fluid communication with an exhaust port 22 and an intake port 24. The intake port 24 may be covered by a filter assembly 26 situated in a filter housing 28 of vacuum head 14.

Motor 16, when powered up, may rotate the suction fan 18 to draw air into the suction inlet opening 30 and through the canister 12, through the filter assembly 26, through the intake port 24 and into the fan chamber 20. The suction fan 18 may push the air in the fan chamber 20 through the exhaust port 22 and out of the vacuum 10. A hose 32 can be attached to the inlet opening 30. The canister 12 can be supported by wheels 34. The wheels 34 may include caster wheels, wheels supported by an axle, or both.

Vacuum 10 may be operated in a variety of modes. In an "Off" mode, operation of motor 16 is prohibited. In an "On" mode, motor 16 is operated. In an "Auto" or "Sensing" mode (hereinafter the "Auto" mode), operation of motor 16 automatically commences upon the activation of a power tool, as described below. Vacuum 10 can be switched between the various operating modes by a switch, knob, or the like by way of non-limiting example.

Figure 3:
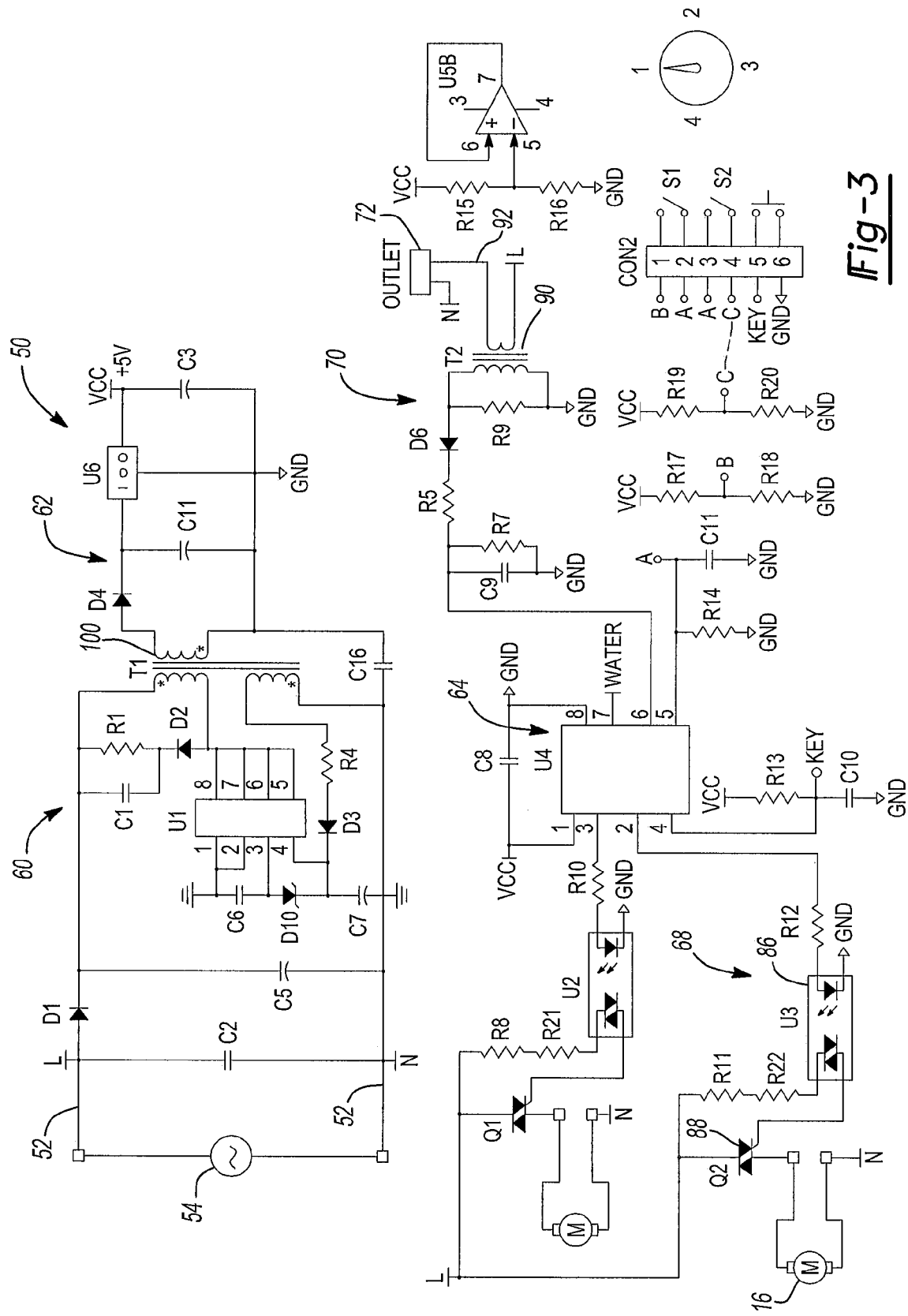
FIG. 3 is a schematic circuit diagram for the electronic controls according to the principles of the present disclosure.

With reference to FIG. 3, a schematic diagram of the electronics 50 utilized to operate the vacuum 10 will now be described. The electronics 50 generally include a power cord 52 extending from the vacuum and adapted for connection with an AC power source 54. In particular, the power cord 52 can include a plug 56 having a two-prong or three-prong connection as is known in the art, as is shown in FIG. 2. The power cord 52 is connected to a power source circuit 60. An electrical isolation circuit 62 is provided in communication with the power source circuit 60 for providing a low voltage output VCC, as will be described in greater detail herein. A controller 64 (for example, a microcontroller) is provided in communication with the electrical isolation circuit 62 for receiving a low voltage supply VCC therefrom. The microcontroller 64 provides control signals to a vacuum circuit 68.

A power tool sense circuit 70 is provided in communication with the microcontroller 64 for providing a signal to the microcontroller 64 regarding operation of a power tool that is plugged into an outlet 72 that can be disposed on the vacuum 10. The outlet 72 can be connected to the power cord 52 as indicated by nodes L, N.

The microcontroller 64 can provide a control signal to the vacuum circuit 68. The vacuum circuit 68 is provided with an opto-coupler 86 which receives a low voltage signal from the microcontroller 64. The opto-coupler 86 can provide an activation voltage to a triac 88 which is held active by the voltage supplied by the opto-coupler 86 to provide electricity to the vacuum motor 16. The opto-coupler 86 requires only a low power input for holding the triac 88 active.

Microcontroller 64 can provide the low voltage signal to opto-coupler 86 to provide an activation voltage to triac 88 in response to operation of vacuum 10 in the "On" mode. Microcontroller 64 can also provide the low voltage signal to opto-coupler 86 to provide an activation voltage to triac 88 in response to operation of vacuum 10 in the "Auto" mode when operation of a power tool connected to outlet 72 is sensed. In the "Off" mode, microcontroller 64 does not provide the low voltage signal to opto-coupler 86.

The power tool sense circuit 70 is provided with a current transformer 90 that senses current passing through an electrical connection to the power outlet 72 that supplies power to a power tool that can be plugged into the power outlet 72. The current transformer 90 provides a signal to the microcontroller 64 indicative of the activation state of a power tool plugged into the outlet 72. In response to the power tool sense circuit 70, the microcontroller 64 can automatically activate the vacuum motor 16 for driving the vacuum source. Thus, when a power tool is plugged into the outlet 72 and is activated by a user, the vacuum motor 16 can be activated to assist in vacuuming debris that is created by the use of the power tool. The microcontroller 64 can delay deactivation of the vacuum motor 16 after the power tool is deactivated, to allow for the vacuum 10 to collect debris for a predetermined period of time after the power tool is deactivated.

The electrical isolation circuit 62 is provided to eliminate shock hazard. Three components provide isolation including the power supply transformer 100 as well as the current transformer 90 and the opto-coupler 86. The power supply transformer 100 provides a reduced voltage output from the power source 54. By way of example, a five volt reduced power supply VCC can be provided by the electrical isolation circuit 62 from the AC line voltage source 54. The power source circuit 60 previous to the transformer 100 is the control circuit for the switching supply. The transformer provides isolation and is part of the switching supply. The 5V regulator takes the isolated control circuit output and reduces it to +5V regulated. The low voltage power supply VCC is utilized by the microcontroller 64 for providing signals to the opto-coupler 86 of vacuum circuit 68. The low voltage power supply VCC can also be used to supply power to a water sense circuit, a filter cleaning circuit, and/or ratio switch circuits by way of non-limiting example.

Figure 4:
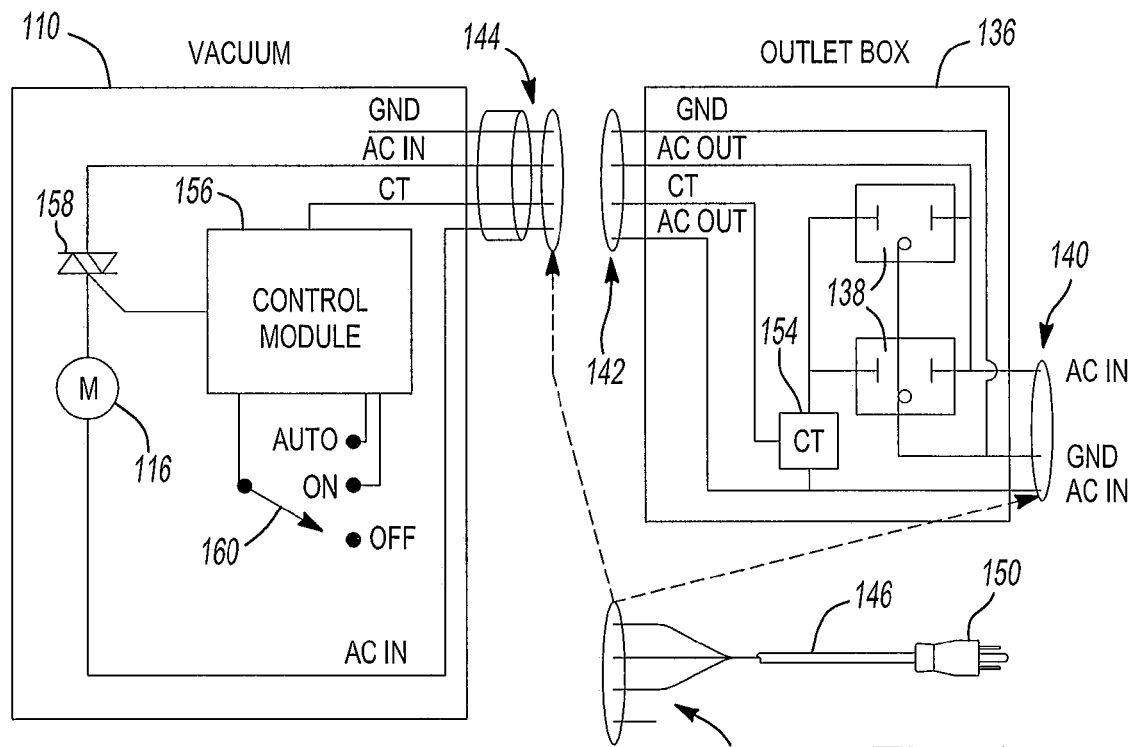
FIG. 4 is a schematic circuit diagram for the electronics for an outlet box for use with a vacuum according to the principles of the present disclosure.
Figure 6:
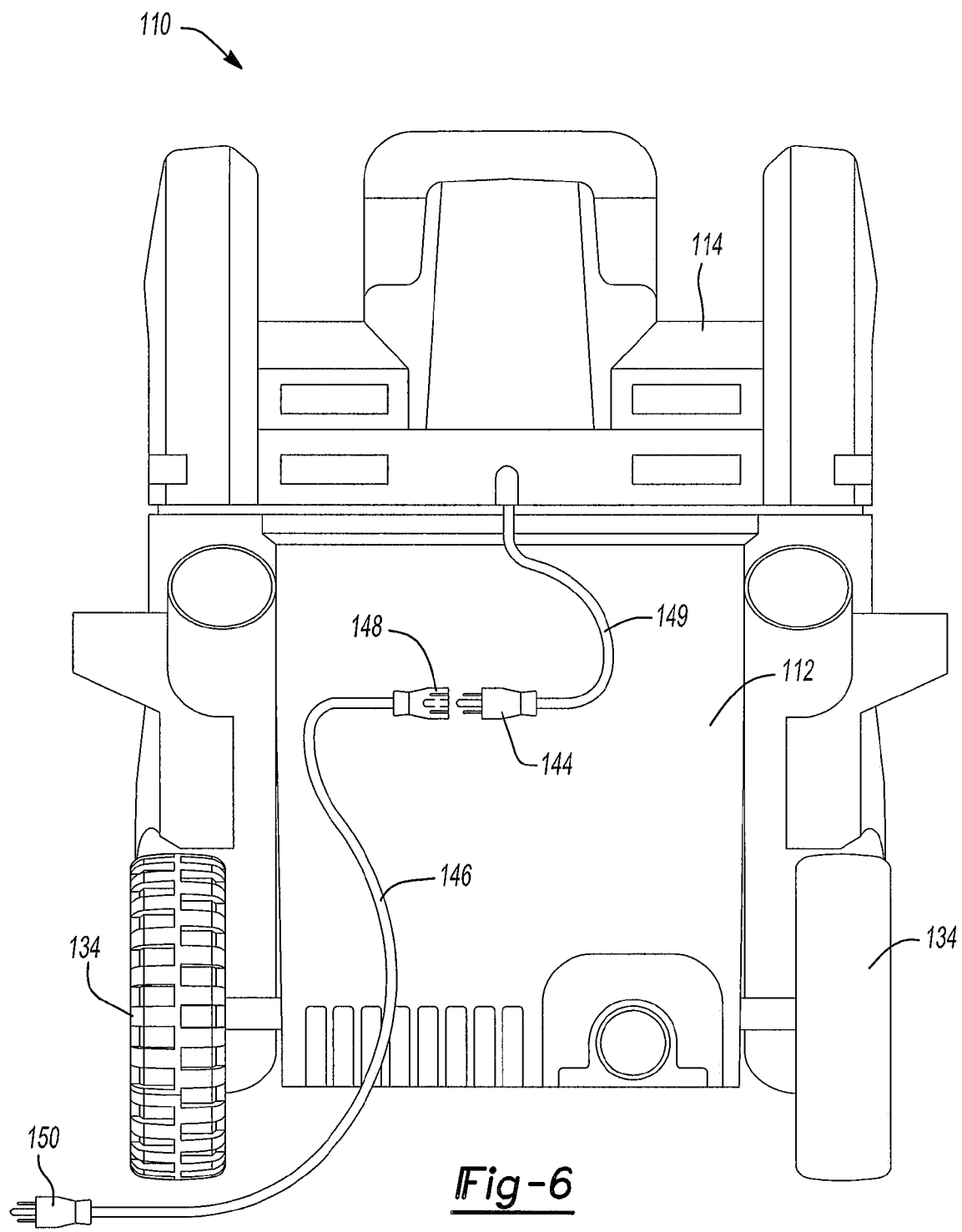
FIG. 6 is a rear plan view of a vacuum with a modified cordset according to the principles of the present disclosure.
Figure 7:
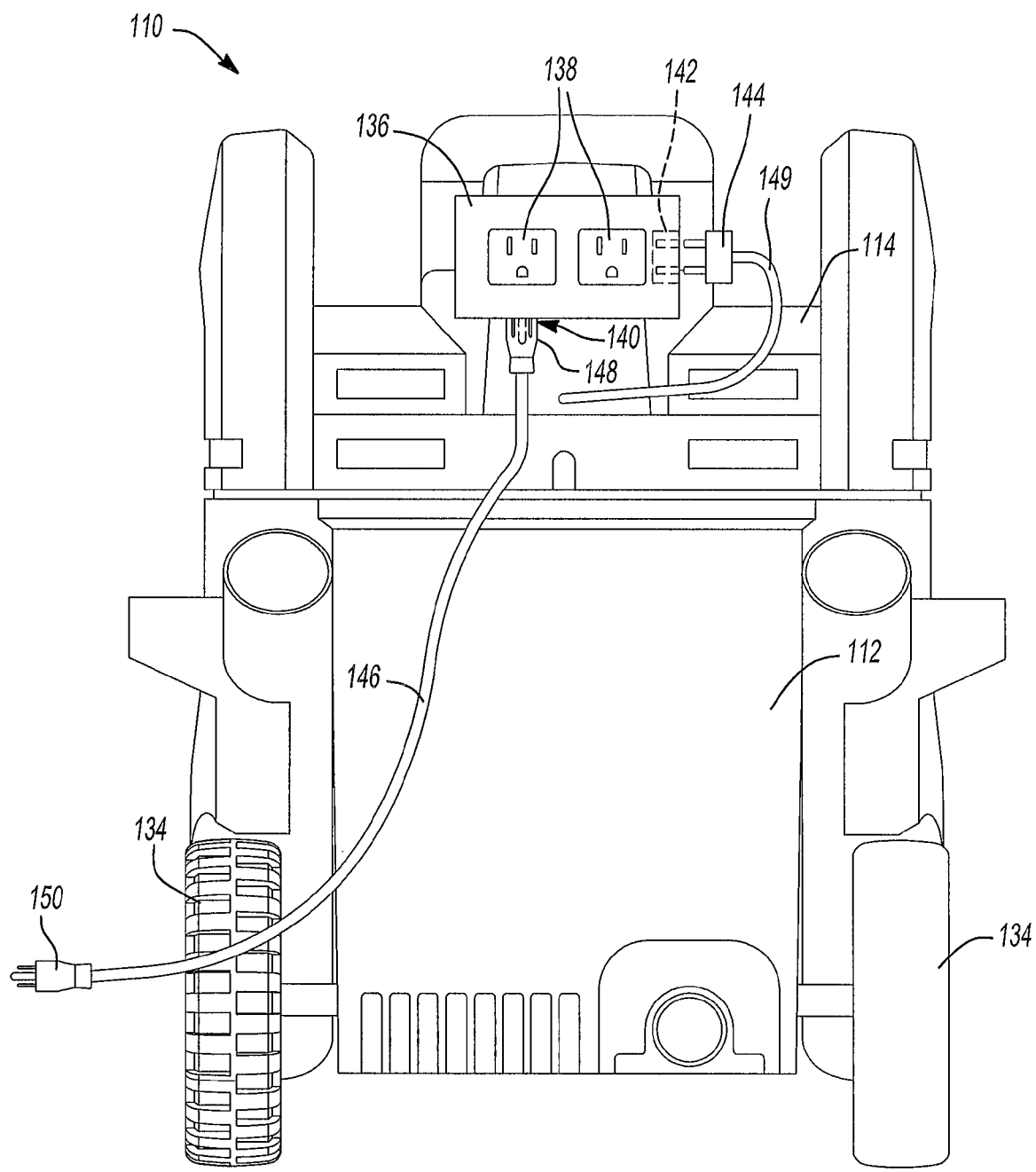
FIG. 7 is a rear plan view of a vacuum with a modified cordset connected to an outlet box according to the principles of the present disclosure.
Figure 9:
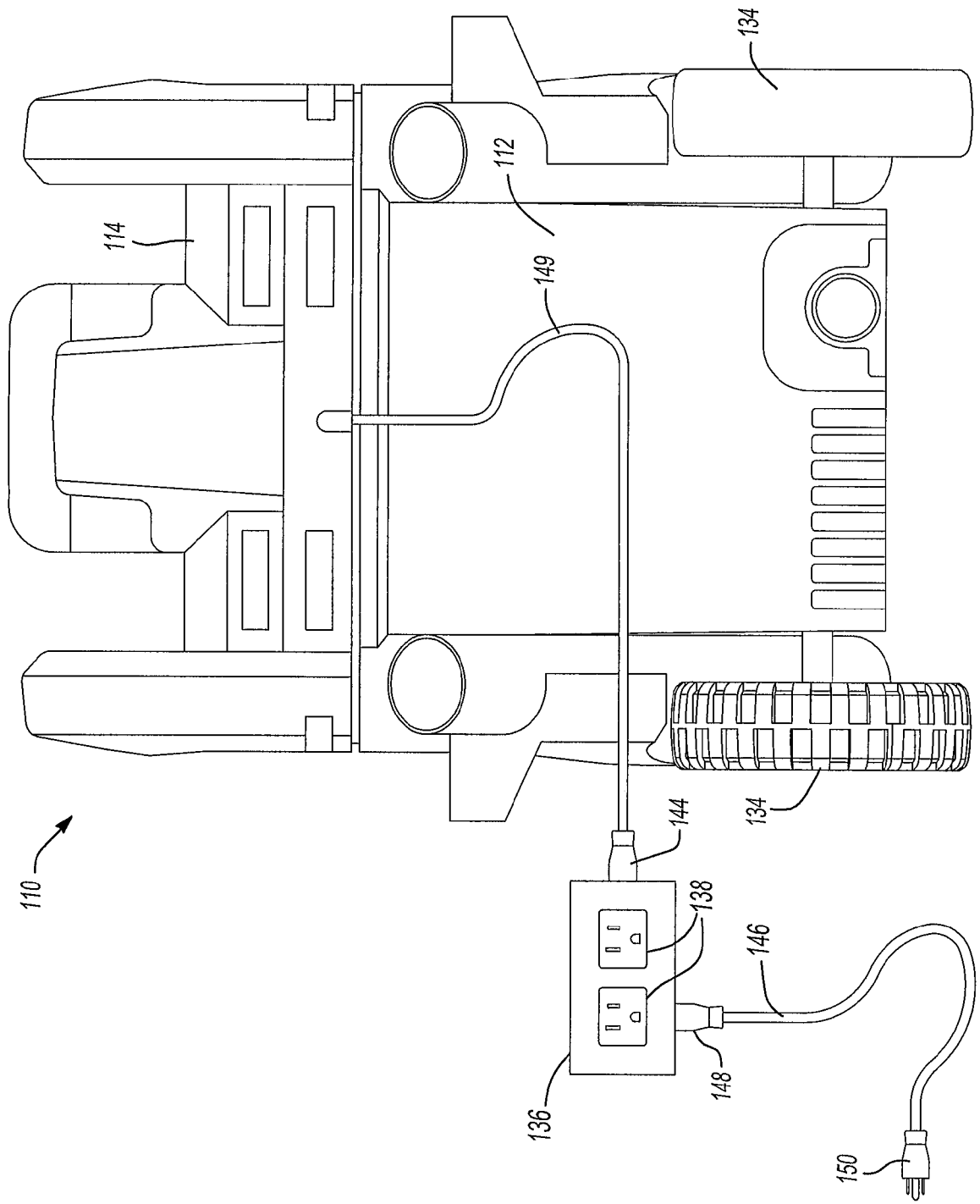
FIG. 9 is a rear plan view of a vacuum with a power strip according to the principles of the present disclosure.

With reference to FIGS. 6, 7, and 9, an alternative vacuum 110, according to the principles of the present disclosure, will now be described. The vacuum 110 may include a canister 112 and a vacuum head 114 that closes the canister 112. The vacuum head may support a drive motor 116 (FIG. 4). The drive motor 116 may support a suction fan, which may be provided in a fan chamber of the vacuum head 114. The fan chamber may be in fluid communication with an exhaust port and an intake port. The intake port may be covered by a filter assembly situated in a filter housing of the vacuum head 114.

The motor 116, when powered up, may rotate the suction fan to draw air into the suction inlet opening and through the canister 112, through the filter assembly, through the intake port and into the fan chamber. The suction fan may push the air in the fan chamber through the exhaust port and out of the vacuum 110. A hose can be attached to the inlet opening. The canister 112 may be supported by wheels 134. The wheels 134 can include caster wheels, wheels supported by an axle, or both.

The vacuum 110 can be utilized in conjunction with an auxiliary outlet box 136. As shown in FIGS. 7 and 9, vacuum 110 can be connected to outlet box 136 and receive electrical power therefrom. Alternatively, as shown in FIG. 6, vacuum 110 can be connected to a power source without utilizing outlet box 136. Outlet box 136 can include one or more plug outlets 138 and can include a first connector 140 which can be coupled to a power supply. Outlet box 136 can provide power to a power tool connected to outlets 138 and to vacuum 110 when connected thereto, as described below.

Vacuum 110 can include multiple modes of operation, such as that discussed above with reference to vacuum 10. For example, vacuum 110 can include an "On" mode wherein motor 116 is operated. Vacuum 110 can also include an "Auto" or "Sensing" mode (hereinafter the "Auto" mode) wherein operation of motor 116 is commenced in response to sensing activation of a power tool connected to outlet 138 of outlet box 136. Vacuum 110 can also include an "Off" mode wherein activation of motor 116 is prevented. Vacuum 110 can be switched between the various operating modes by a switch, knob, or the like by way of non-limiting example.

With reference to FIG. 4, a schematic diagram of the electronics utilized to operate the vacuum 110 will now be described. Auxiliary outlet box 136 is provided for electrical connection to the vacuum 110. The auxiliary outlet box 136 can include one or more plug outlets 138 and can include first connector 140 and a second connector 142. The first connector 140 is illustrated as a male connector and can include a pair of "AC In" connectors and a ground connector. The second connector 142 is illustrated as a female connector and can include a pair of "AC Out" connectors, a ground connector, and a control signal connector CT. The second connector 142 is adapted to be connected to a male connector 144 of the vacuum 110, the male connector 144 having corresponding connectors to the second connector 142, namely a pair of "AC In" connectors, a ground connector, and a control signal connector CT.

A power cord 146 can be used to supply AC power to vacuum 110 or outlet box 136. Power cord 146 can have a female connector 148 at a first end adapted to be connected to either the male connector 144 of the vacuum 110 or the male connector 140 of the outlet box 136. The male connector 144 can be provided on the vacuum housing or on a short cable 149. The female connector 148 includes a pair of AC connectors, a ground connector, and a fourth dummy receptor that can receive the control signal connector CT of male connector 144 of the vacuum 110. A second end of the power cord 146 includes a plug 150 adapted for connection with an AC power source. In particular, the plug 150 can include a three-prong connection as is known in the art.

Figure 5:
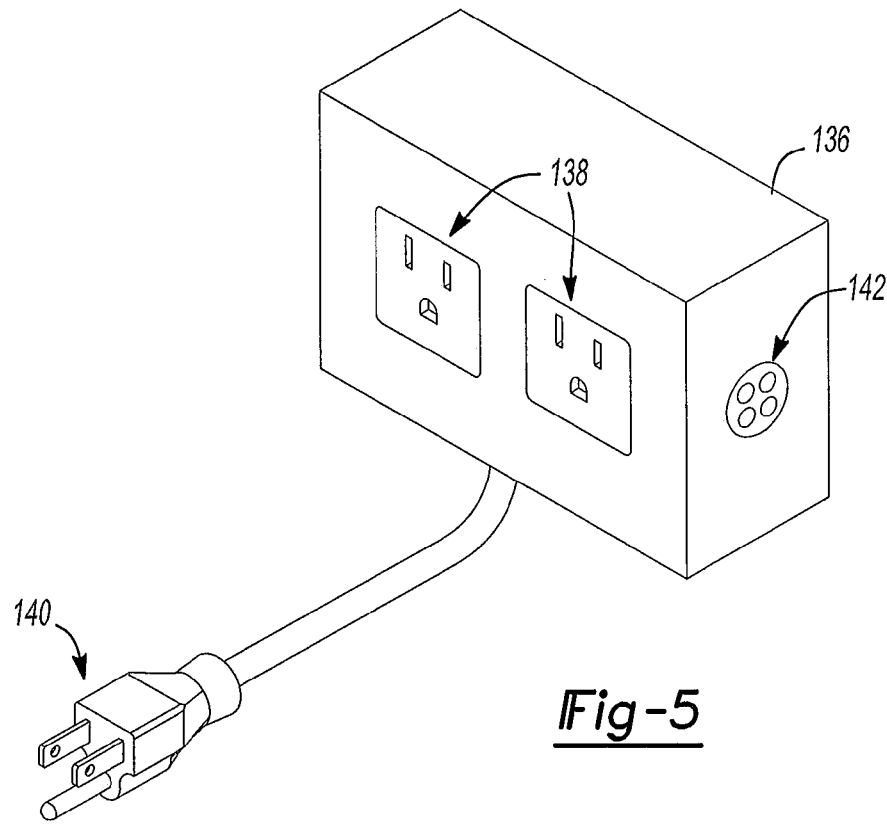
FIG. 5 is a perspective view of an outlet box for use with a vacuum according to the principles of the present disclosure.

The outlet box 136 can be mounted to any surface of the vacuum 110, such as shown in FIG. 7, or can be used without being mounted on the vacuum 110, such as shown in FIG. 9. The outlet box 136 can also be used as an outlet strip without the vacuum 110, as shown in FIG. 5.

A power tool sense circuit 154 is provided in communication with one or more of the outlets 138 and is connectable to a control module 156 for providing a signal to the control module 156 regarding operation of a power tool that is plugged into an outlet 138 on the outlet box 136. The outlet 138 can be connected to the power cord 146 as indicated by nodes AC In, GND, AC In.

Figure 8:
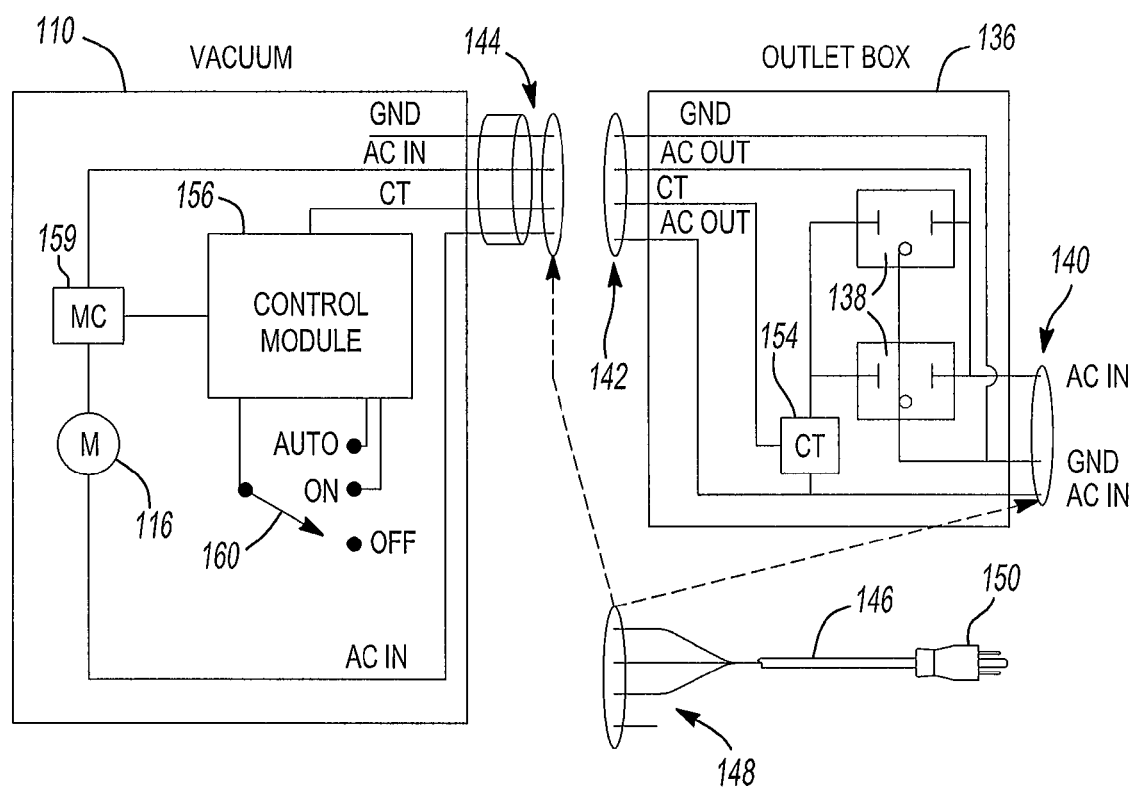
FIG. 8 is a schematic circuit diagram for alternative electronics for an outlet box for use with a vacuum according to the principles of the present disclosure.

The power tool sense circuit 154 can be provided with a current transformer that senses current passing through an electrical connection to the power outlets 138 that supplies power to a power tool that can be plugged into the power outlets 138. The power tool sense circuit 154 provides a signal to the control module 156 indicative to the activation state of a power tool plugged into the outlets 138. In response to the power tool sense circuit 154, the control module 156 can automatically activate the vacuum motor 116 for driving the vacuum source. In particular, the control module 156 can provide a control signal to a triac 158 to hold the triac 158 active to provide electricity to the vacuum motor 116. Alternatively, as illustrated in FIG. 8, the control module 156 can provide a control signal to a motor control module 159 to provide electricity to the vacuum motor 116. The power tool sense circuit 154 and control module 156 can be similar to the system described with reference to FIG. 3 with the current sense system in the outlet box 136 and the controller in the vacuum 110. The control module can be a microcontroller or dedicated control circuit. Thus, when a power tool is plugged into the outlets 138 and is activated by a user, the vacuum motor 116 can be activated to assist in vacuuming debris that is created by the use of the power tool. The control module 156 can delay deactivation of the vacuum motor 116 after the power tool is deactivated, to allow for the vacuum 110 to collect debris for a predetermined period of time after the power tool is deactivated.

Figure 10:
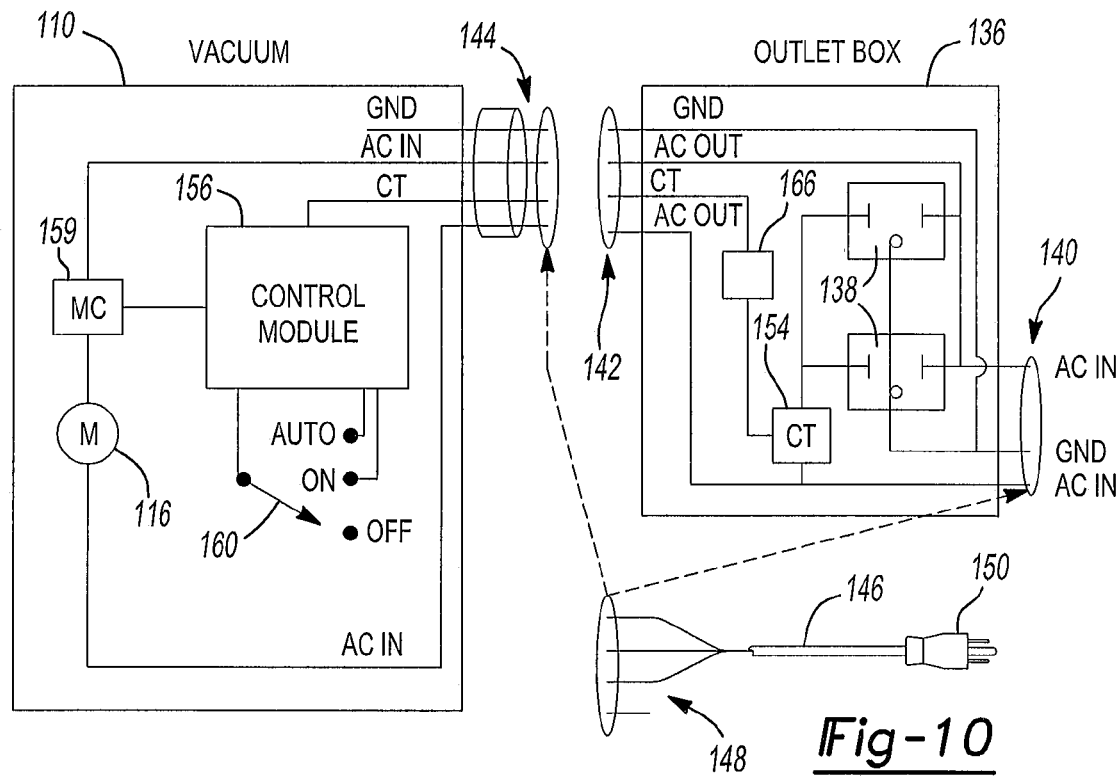
FIG. 10 is a schematic circuit diagram for alternative electronics for an outlet box for use with a vacuum according to the principles of the present disclosure.

In some exemplary configurations, as shown in FIG. 10, the outlet box 136 can also be provided with smart electronics 166 (either a module, a controller, or dedicated circuit) to process the power tool sense signal and send a vacuum "On" or vacuum "Off" signal to the electronics in vacuum 110. For example, the power tool sense signal could be converted to DC, rectified, and filtered. The electronics in the vacuum 110 receive this processed signal and act accordingly depending on the operational mode of vacuum 110 as determined by a control switch 160 position ("Off" mode, "On" mode, "Auto" mode). This system may be less noise sensitive than sending an analog CT signal.

Figure 11:
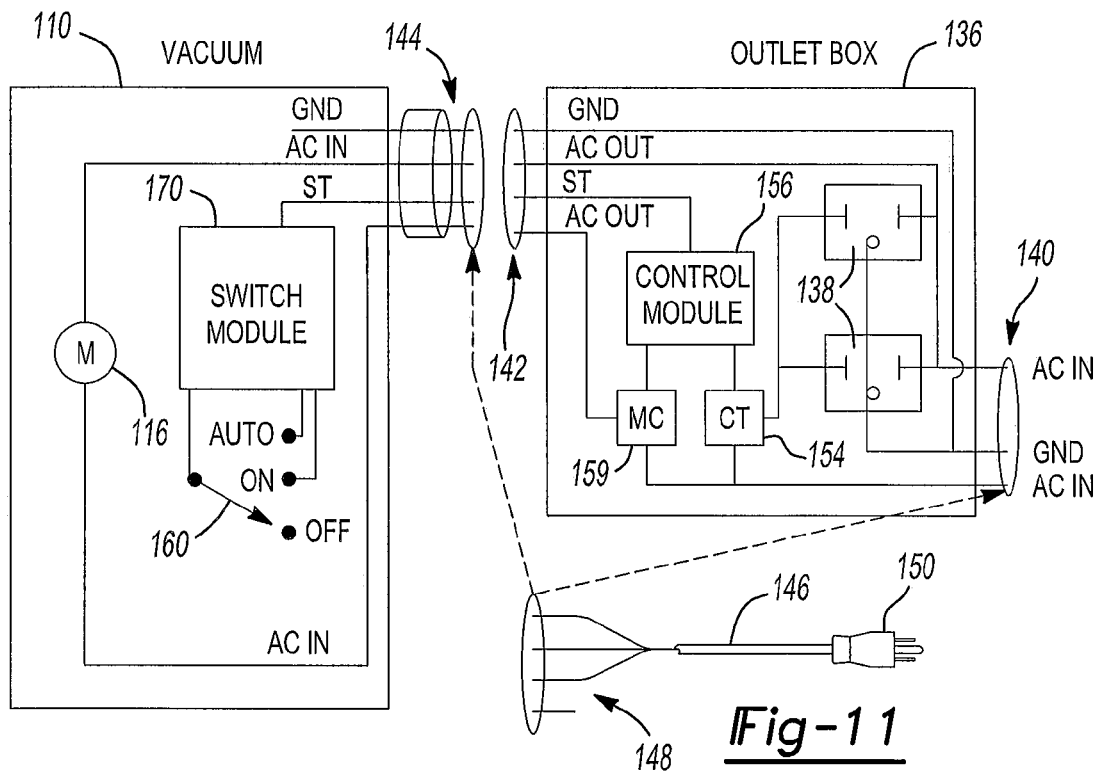
FIG. 11 is a schematic circuit diagram for alternative electronics for an outlet box for use with a vacuum according to the principles of the present disclosure.

As yet another alternative, as shown in FIG. 11, the control electronics can all be provided in the outlet box 136. The outlet box 136 can include control module 156 and motor control module 159. Motor control module 159 can include a triac. Vacuum 110 can include a switch module 170 connected to switch 160. Switch module 170 can provide a switch signal ST to control module 156 indicative of the desired operational mode of vacuum 110 provided by control switch 160 position. Switch signal ST can be switch information provided directly through a high or low signal with one wire for each micro switch or through serial communication. Control module 156 provides signals to motor control module 159 to operate motor 116 based on the switch signal ST and the power tool sense signal provided by CT 154, as described above. The electronics within the outlet box 136 can directly control power to the vacuum motor 116. The advantage of this setup is reduced electronics in the vacuum 110 and the power tool sense signal is fairly noise insensitive. The control of the motor control module 159 within the outlet box 136 provides an electrical connection to the vacuum motor 116.

A control switch 160 is provided for controlling the vacuum 110 in "ON", "OFF" and "AUTO" modes of operation. In the "ON" mode, the vacuum motor is turned on. In the "OFF" mode, the vacuum motor is turned off. In the "AUTO" mode, the vacuum motor is activated in response to a signal from the power tool sense circuit 154.

In this example embodiment, the outlet box 136 may include two power outlets 138. Alternative embodiments may implement more or less than two power outlets 138. Additionally, it should be appreciated that while male and female connectors are shown and described with reference to specific connectors, the use of male and female connectors for the various connectors can be changed from that shown. Moreover, in some configurations the outlet box 136 may be limited in operation such that outlets 138 are not operable to supply electricity to a power tool connected thereto when the vacuum 110 is in any mode other than the "Auto" mode. Furthermore, while power tool sense signal CT and switch signal ST are shown as being provided through a single line/wire, multiple lines/wires may be utilized. Additionally, in some configurations, it may be possible to connect the first connector 140 of the outlet box 136 directly to a power source without the use of power cord 146.

Thus, the foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vacuum system comprising:
   a vacuum having a housing and a vacuum source disposed in said housing;
   an outlet box separate from said vacuum and electrically connected to said vacuum;
   a power tool sensing system for sensing operation of a power tool plugged into said outlet box;
   a control module for operating said vacuum source in response to a sensed operation of said power tool, wherein said vacuum includes a first connector having at least four connections, said outlet box includes a second connector having at least four connections and adapted to engage said first connector to electrically connect said outlet box to said vacuum; and
   wherein said outlet box includes a third connector electrically connected to said second connector, and further comprising a power cord including a fourth connector having at least four connections, said power cord adapted to be connected to either of said first and third connectors to supply electrical power to either of said vacuum and said outlet box, and said power cord including a fifth connector adapted to connect to a power source.

2. A vacuum system comprising:
   a vacuum having a housing and a vacuum source disposed in said housing;
   an outlet box separate from said vacuum and electrically connected to said vacuum;
   a power tool sensing system for sensing operation of a power tool plugged into said outlet box; and
   a control module for operating said vacuum source in response to a sensed operation of said power tool, wherein said outlet box includes a first connector and a second connector, said vacuum includes a third connector adapted to engage said first connector of said outlet box and electrically connect said outlet box to said vacuum, and further comprising a power cord having a fourth connector adapted to be connected to either of said second connector of said outlet box and said third connector of said vacuum to supply electrical power to either of said outlet box and said vacuum.

3. A vacuum comprising:
   a housing;
   a vacuum source disposed in said housing and including a motor;
   an outlet electrically connected to said vacuum source;
   a power tool sensing system for sensing operation of a power tool plugged into said outlet; and
   a control circuit for operating said vacuum source in response to a sensed operation of said power tool, said control circuit including a triac that provides electricity to said motor of said vacuum source, and an opto-coupler that provides an activation voltage to said triac, said triac providing electricity to said motor when receiving said activation voltage from said opto-coupler.

4. The vacuum according to claim 3, wherein said control module includes a microcontroller that receives a signal from said power tool sensing system and provides a signal to said opto-coupler to provide said activation voltage to said triac in response to said signal from said power tool sensing system.

5. The vacuum according to claim 4, wherein said power tool sensing system includes a current transformer for sensing current passing through said outlet to said power tool.

* * * * *